(12) United States Patent
Sakaguchi

(10) Patent No.: US 8,346,619 B2
(45) Date of Patent: Jan. 1, 2013

(54) SYSTEM FOR MEDIATING TRANSACTION INFORMATION AND DEVICE IN THE SYSTEM

(75) Inventor: Naohiro Sakaguchi, Tokyo (JP)

(73) Assignee: Firstlogic, Inc., Tokyo (JP)

( * ) Notice: Subject to any disclaimer, the term of this patent is extended or adjusted under 35 U.S.C. 154(b) by 296 days.

(21) Appl. No.: 12/861,963

(22) Filed: Aug. 24, 2010

(65) Prior Publication Data

US 2012/0054067 A1    Mar. 1, 2012

(51) Int. Cl.
G06Q 30/00 (2012.01)
(52) U.S. Cl. .................................................. 705/26.1
(58) Field of Classification Search .............. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | | |
|---|---|---|---|---|
| 5,500,793 | A | * | 3/1996 | Deming et al. ............... 705/37 |
| 5,794,207 | A | | 8/1998 | Walker et al. |
| 6,847,938 | B1 | * | 1/2005 | Moore ...................... 705/26.41 |
| 8,204,790 | B1 | * | 6/2012 | Rogers et al. ............... 705/26.1 |
| 2002/0032633 | A1 | * | 3/2002 | Okumura ...................... 705/37 |
| 2003/0158824 | A1 | * | 8/2003 | Aisu ........................... 705/400 |

FOREIGN PATENT DOCUMENTS

| | | |
|---|---|---|
| JP | 2001-283032 | 10/2001 |
| JP | 2001-306948 | 11/2001 |
| JP | 2002-032587 | 1/2002 |
| JP | 2002-041848 | 2/2002 |
| JP | 2002-169986 | 6/2002 |
| JP | 2002-245284 | 8/2002 |
| JP | 2003-030478 | 1/2003 |
| JP | 2003-296628 | 10/2003 |
| JP | 2004-094756 | 3/2004 |
| JP | 2004-171198 | 6/2004 |
| JP | 2004-295821 | 10/2004 |
| JP | 2007-233614 | 9/2007 |
| WO | WO 2005/103980 | 11/2005 |

OTHER PUBLICATIONS

Kaplan et al. "B2B E-Commerce Hubs: Towards a Taxonomy of Business Models", Dec. 1999.*
Sawhney et al. "The Emerging Landscape of Business to Business E-Commerce", Sep. 1999.*
http://auctions.yahoo.co.jp/, (Jan. 7, 2008).

* cited by examiner

*Primary Examiner* — Naeem Haq
(74) *Attorney, Agent, or Firm* — Berenato & White, LLC

(57) ABSTRACT

The present invention provides an intermediation system of transaction that has purchasing indicators to show purchase intent of buyers in transaction through a network. The intermediation system includes first user terminals for requesting the acquisition of information about predetermined products or services, second several user terminals for providing information on products or services which they offer, and an intermediation device for mediating the information between the first user terminals and the second user terminals. The first and second user terminals and the intermediation device are interconnected over a network.

11 Claims, 8 Drawing Sheets

FIG. 3

| DETAIL | FUND | COLLATERAL MARGIN | LOCATION | BUDGET | CATEGORY | STRUCTURE | COUPON YIELD | LAST UPDATE |
|---|---|---|---|---|---|---|---|---|
| DEATIL | 3,210 | 1,357 | 23 WARDS OF TOKYO | 3,256 | FLOOR | RC (OR SRC) | 9% | 2008/1/1 |
| DEATIL | 100,000 | 100,000 | SAITAMA | 100,000 | REGION | DON'T CARE | 1% | 2007/10/1 |
| DEATIL | 123 | なし | HOKKAIDO | 123 | FLOOR | RC (OR SRC) | 1% | 2007/11/23 |
| DEATIL | 2,500 | なし | WHOLE AREA OF TOKYO | 2,500 | LAND | | | 2008/4/5 |

FIG. 4

| NAME | FIRST [ ] LAST [ ] |
| --- | --- |
| MEMBER'S CATEGORY | ● CORPORATE ○ PRIVATE |
| BUSINESS | [ SELECT ▼ ] |
| CAMPANY'S NAME | [ ] |
| ZIP CODE | [ ] |
| ADDRESS | [ ] |
| MAIL ADDRESS | [ ] |
| MAIL ADDRESS (RE-ENTER) | [ ] |
| PHONE NUMBER | [ ] |
| CELLULAR PHONE NUMBER | [ ] |
| FAX NUMBER | [ ] |
| OCCUPATION | [ SELECT ▼ ] |
| HOUSEHOLD INCOME | [ SELECT ▼ ] |

LOG-IN PASSWORD [ ]
(Halfwidth alphabet or digit character. Password must be 4 to 20 characters long.)

LOG-IN PASSWORD(RE-ENTER) [ ]
(Halfwidth alphabet or digit character. Password must be 4 to 20 characters long.)

SYSTEM FOR MEDIATING TRANSACTION INFORMATION AND DEVICE IN THE SYSTEM

BACKGROUND OF THE INVENTION

1. Field of the Invention

The present invention relates to an intermediation system providing business information of an article or service through a network and an intermediation device used in the system.

2. Description of the Related Art

The development of the Internet makes it possible to acquire various kinds of information via personal computers, cellular phones and PDAs. To give an example, information on various products or services can be obtained. In addition, an auction site on the Internet or a reverse auction site thereon is used, and various kinds of business is performed (for example, refer to the website at http://auctions.yahoo.co.jp/ (Jan. 7, 2008)).

An Internet auction is an auction to be held via the Internet. Specifically, an unspecified number of persons price any of exhibited articles on screens of computers, etc. connected to the Internet, and only the highest bidder can obtain the article. A typical Internet auction site is configured as follows.

(1) Participants (buyers) bid prices for a certain product individually during a predetermined period. The highest bidder receives an e-mail message indicating that he or she has won the product.

(2) The exhibitor (seller) of the product informs the highest bidder of the remittance and delivery systems.

(3) The bidder pays money and the exhibitor sends the product in response to the payment.

Nowadays, there are various kinds of auction sites on the Internet, it is advantageous in that many goods can be purchased cheaply with enjoyment, but because there is a pit for business with an unknown partner, attention is needed. As described above, when simple Internet auctions are utilized, there is the case that a trouble about an article follows.

Currently, reverse auctions of which system is opposite to that of auctions are also popular. In a reverse auction, a buyer requests a product that the buyer wants and its desired price. In response, sellers offer their products that are suitable for the request of the buyer. The buyer selects the cheapest one among the offered products, and finally purchases it. A reverse auction system of this type is often applied to public works tenders.

U.S. Pat. No. 5,794,207 discloses a method of transacting goods on an Internet reverse auction. This method is carried out as follows.

A buyer sends a mediator of the reverse auction a request of a product that the buyer wants, its conditions, and the buyer's credit card account. In response to the request, sellers send the mediator their estimations. The mediator chooses the most suitable one among the estimations, and informs the buyer about the seller for the selected estimation. The buyer purchases a product that this seller offers.

Another style of transaction over the Internet is a website trading. The website trading provides a system in which a website mediates the trade of products between buyers and sellers over the Internet. Products or services that the sellers offer are displayed on this website.

In such a website trading, a transaction is conducted as follows.

(1) Buyers first need to register them to the website as members in order to participate in the trade. A person entitled to be the member is limited to an employee for a corporation or a member for an organization who has purchasing authority.

(2) An administrator of the website exams the entry persons and, then provides IDs and passwords if the examination is successful. The member (buyer) inputs a desired product and its categories, the number of the product and its price to the site. If some of other members (sellers) have interest in the inputted information, then they can contact the buyer. The sellers offer their products, and a seller who has offers the product of the lowest price among the sellers can bid.

The merit of such website trading is that sellers can promote their sales, that is, to get a chance to sell their products to different persons from conventional customers without incurring cost. In addition, it is advantageous to sell competitive products or inventories. Meanwhile, the merit of buyers is to increase their opportunities to purchase desired products at low prices.

As described above, electronic commerce or transaction thereof over a network such as the Internet has become popular.

JP2004-171198 (claims 1 and 18) discloses a method of trading real estate properties. This method makes it possible to make a contract of transacting real estate properties over a network while eliminating unnecessary information, and to provide a real estate trading site containing fresh, secure and a lot of information. Specifically, this method relates to real estate trade to be made between browsers of the site and real estate agencies over a network. Furthermore, the method includes the steps of registering a user to a server connected to a network as a formal member, registering an agency to the server as an agent member, retrieving data on all the agent members from a terminal connected to the server, selecting desired one among all the agent members based on the retrieved data, and making a user confirm a contract between the user and the selected agent member.

JP2004-171198 (claims 1 and 18) discloses a method of determining population ranking of real estate properties over a network by users and agencies. This method includes the steps of retrieving, by a user, information on real estate properties from a terminal connected to a server through a network, viewing details of attracting properties, viewing drawings of the properties, counting the number of reviewing the details and drawings of the properties, retrieving, by an agency, information on real estate properties from a terminal connected to a server through the network, viewing details of attracting properties, reviewing drawings of the properties, counting the number of reviewing the details and drawings of the properties, and showing the counted number to the users and agencies.

As described above, various transaction methods which are conducted over a network are presently available. However, has not yet been conceived, any network system in which sellers can find potential customers based on information on products or services that buyers wish to purchase. Especially, it is difficult to give proper information to potential buyers, because some of buyers who are seemingly earnest might be in fact just browsers.

Typically, when receiving inquiries from many customers, a seller tries to give the answers to them in the order of the degree of their enthusiasms. However, there is no method of measuring the enthusiasms of buyers. Therefore, a seller may end up in losing potential customers, because the seller gives a higher priority to just viewers such as pricer than potential customers. Also, potential customers may feel dissatisfied because they cannot obtain necessary information timely.

Taking the above disadvantages into account, the present invention has been conceived. An object of the present invention is to provide a system for mediating transaction information, which can measure enthusiasms of buyers and uses the measured enthusiasms as parameters. An additional object of the present invention is to provide a device used in the above system.

SUMMARY OF THE INVENTION

A first aspect of the present invention solving the problem relates to an intermediation system of business information, which comprises first user terminals, second user terminals and an intermediation device that are all interconnected over a network. The first user terminals are adapted to request the acquisition of information about predetermined products or services. The second user terminals are adapted to provide information about products or services. The intermediation device is adapted to mediate the exchange of the information between both terminals, and it is provided with a site displaying the products or services which the second user terminals offer. The intermediation system is designed to select one among the first user terminals based on the condition of the first user terminals, and to provide the selected first user terminal with the information about the products or services. The intermediation device configured above comprises:

(a1) a first user terminal information manager for storing information on the first user terminals and their desired products or services, and for determining or updating purchasing indicators of the first user terminals, based on parameters regarding the first user terminals, the purchasing indicators representing how much the first user terminals have interests in a product or service;

(a2) a second user terminal information manager for storing information on the second user terminals, products or services that the second user terminals offer, and requirement for selling the products or services;

a search unit for selecting a first user terminal among the first user terminals which is the most suitable for a product or service which any one of the second user terminals offers, based on the purchasing indicators and the requirement for selling the products or services; and (a3) a response form manager for creating a response form containing acceptance and declination items to be used when the first user terminals respond to proposals from the second user terminals.

Moreover, the intermediation device informs the second user terminal about the search result when the intermediation device selects a first user terminal among the first user terminals in accordance with requirement from any one of the second user terminals, and the second user terminal sends the first user terminal the information on a product or service which the second user terminal offers, while the response form manager sends the response form to the first user terminal. The first user terminal information manager measures a frequency with which the first user terminal responds to the response form, and increases a value of a first parameter of the parameters as the frequency is higher. The first user terminal information manager measures a period between moments at which the first user terminal receives the response form and responds to it, and increase a value of a second parameter of the parameters as the period is shorter. The first user terminal information manager determines or updates the purchasing indicator based on the first and second parameters and classifies the purchasing indicator into a plurality of levels based on a value thereof. If the first user terminal does not respond to the respond form, then the intermediation device sends, at regular intervals, massages for recommending the response to the first user terminal, and the first user terminal information manager makes the first parameter lower as the frequency is lower and makes the second parameter lower as the period is longer, and the first user terminal information manager determines or updates the purchasing indicator based on the first and second parameters. If the intermediation device receives the response form in which the first user terminal checks the acceptance item, the intermediation device sends a message for recommending business discussion to the first and second user terminals. If the intermediation device receives the response form in which the first user terminal checks the declination item, the intermediation device sends a message for recommending reconsideration.

A second aspect of the present invention solving the problem relates to an intermediation device of business information, which is connected to first user terminals and second user terminals over a network. The first user terminals are adapted to request the acquisition of information about predetermined products or services. The second user terminals are adapted to provide information about products or services. The intermediation device is adapted to mediate the exchange of the information between both terminals, and it is provided with a site displaying the products or services which the second user terminals offer. In addition, the intermediation device is designed to select one among the first user terminals based on the condition of the first user terminals, and to provide the selected first user terminal with the information about the products or services.

The intermediation device configured above comprises:

(b1) a first user terminal information manager for storing information on the first user terminals and their desired products or services, and for determining or updating purchasing indicators of the first user terminals, based on parameters regarding the first user terminals, the purchasing indicators representing how much the first user terminals have interests in a product or service;

(b2) a second user terminal information manager for storing information on the second user terminals, products or services that the second user terminals offer, and requirement for selling the products or services;

a search unit for selecting a first user terminal among the first user terminals which is the most suitable for a product or service which any one of the second user terminals offers, based on the purchasing indicators and the requirement for selling the products or services; and (b3) a response form manager for creating a response form containing acceptance and declination items to be used when the first user terminals respond to proposals from the second user terminals.

Moreover, the device sends the second user terminal a message for recommending sending of a product or service which the second user terminal offers to the selected first user terminal. The first user terminal information manager measures a frequency with which the first user terminal responds to the response form, and increases a value of a first parameter of the parameters as the frequency is higher. The first user terminal information manager measures a period between moments at which the first user terminal receives the response form and responds to it, and increase a value of a second parameter of the parameters as the period is shorter. The first user terminal information manager determines or updates the purchasing indicator based on the first and second parameters and classifies the purchasing indicator into a plurality of levels based on a value thereof. If the first user terminal does not respond to the respond form, then the device sends, at regular intervals, massages for recommending the response to the first user terminal. If the device receives the response form in which the first user terminal checks the acceptance item, the device sends a message for recommending trading discussion to the first and second user terminals. If the device receives the response form in which the first user terminal checks the declination item, the device sends a message for recommending reconsideration.

A third aspect of the present invention solving the problem relates to an information distribution device connected to first user terminals via a network. The first user terminals are adapted to receive information on a desired product or service. The information distribution device is designed to provide the first user terminals with information on products or services which the first user terminals wish.

The information distribution device configured above comprises:

(c1) a first user terminal information manager for storing information on the first user terminals and their desired products or services, and for determining or updating purchasing indicators of the first user terminals, based on parameters regarding the first user terminals, the purchasing indicators representing how much the first user terminals have interests in a product or service;

(c2) a product/service information manager for storing information on products or services and requirement for selling products or services;

(c3) a search unit for selecting a first user terminal among the first user terminals which is the most suitable for any one of the products or services, based on the purchasing indicators and the requirement for selling the products or services; and (c4) a response form manager for creating a response form containing acceptance and declination items to be used when the first user terminals respond to the received information.

Moreover, the information distribution device sends information on the product or service to the selected first user terminal. The first user terminal information manager measures a frequency with which the first user terminal responds to the response form, and increases a value of a first parameter of the parameters as the frequency is higher. The first user terminal information manager measures a period between moments at which the first user terminal receives the response form and responds to it, and increase a value of a second parameter of the parameters as the period is shorter. The first user terminal information manager determines or updates the purchasing indicator based on the first and second parameters and classifies the purchasing indicator into a plurality of levels based on a value thereof. If the first user terminal does not respond to the respond form, then the information distribution device sends, at regular intervals, massages for recommending the response to the first user terminal. If the information distribution device receives the response form in which the first user terminal checks the acceptance item, the information distribution device sends a message for recommending trading discussion to the first user terminal. If the information distribution device receives the response form in which the first user terminal checks the declination item, the information distribution device sends a message for recommending reconsideration.

A fourth of the present invention solving the problem relates to a method of providing information on products or services by mediating the information between first user terminals and second user terminals. The method is to be executed by an intermediation device connected between the first and second user terminals via a network. The first user terminals are adapted to receive information on a desired product or service. The second user terminals are adapted to provide information on products or services which they offer.

The method comprising:

(d1) a first step of maintaining information on the first user terminals, including their desired products or services, and determining or updating purchasing indicators of the first user terminals, based on parameters regarding the first user terminals, the purchasing indicators representing how much the first user terminals have interests in a product or service;

(d2) a second step of maintaining information on the second user terminals, including information on their products or services and requirement for selling products or services;

a third step of selecting a first user terminal among the first user terminals which is the most suitable for a product or service which any one of the second user terminals offers, based on the purchasing indicators and the requirement for selling the products or services;

(d3) a fourth step of informing the second user terminal about the first user terminal having been selected in the third step, and sending, to the second user terminal, a message for recommending sending of information on the product or service to the selected first user terminal;

(d4) a fifth step of sending, to the selected first user terminal, a response form containing acceptance and declination items which is to be used to respond to the information from the second user terminal;

(d5) a sixth step of sending, at regular intervals, massages for recommending the response to the first user terminal if the first user terminal does not respond to the respond form;

(d6) a seventh step of sending a message for recommending reconsideration if the intermediation device receives the response form in which the first user terminal checks the declination item; and (d7) an eighth step of sending a message for recommending trading discussion to the first and second user terminals if the device receives the response form in which the first user terminal checks the acceptance item.

Moreover, in the first step of determining or updating the purchasing indicators of the first user terminals, based on the parameters, the parameter includes first and second parameters. The intermediation device measures a frequency with which the first user terminal responds to the response form, and increases a value of a first parameter of the parameters as the frequency is higher. The intermediation device measures a period between moments at which the first user terminal receives the response form and responds to it, and increase a value of a second parameter of the parameters as the period is shorter. The purchasing indicators are classified into a plurality of levels based on a value thereof.

A fifth aspect of the present invention solving the problem relates to a computer readable medium storing program which makes a computer execute a method of providing information on products or services by mediating the information between first user terminals and second user terminals. The method is to be executed by an intermediation device connected between the first and second user terminals via a network. The first user terminals are adapted to receive information on a desired product or service. The second user terminals are adapted to provide information on products or services which they offer.

The method comprises:

(e1) a first step of maintaining information on the first user terminals, including their desired products or services, and determining or updating purchasing indicators of the first user terminals, based on parameters regarding the first user terminals, the purchasing indicators representing how much the first user terminals have interests in a product or service;

(e1) a second step of maintaining information on the second user terminals, including information on their products or services and requirement for selling products or services;

(e2) a third step of selecting a first user terminal among the first user terminals which is the most suitable for a product or service which any one of the second user terminals offers, based on the purchasing indicators and the requirement for selling the products or services;

(e3) a fourth step of informing the second user terminal about the first user terminal having been selected in the third step, and sending, to the second user terminal, a message for recommending sending of information on the product or service to the selected first user terminal;

(e4) a fifth step of sending, to the selected first user terminal, a response form containing acceptance and declination items which is to be used to respond to the information from the second user terminal;

(e5) a sixth step of sending, at regular intervals, massages for recommending the response to the first user terminal if the first user terminal does not respond to the respond form;

(e6) a seventh step of sending a message for recommending reconsideration if the intermediation device receives the response form in which the first user terminal checks the declination item; and (e6) an eighth step of sending a message for recommending trading discussion to the first and second user terminals if the device receives the response form in which the first user terminal checks the acceptance item.

Moreover, in the first step of determining or updating the purchasing indicators of the first user terminals, based on the parameters, the parameter includes first and second parameters. The intermediation device measures a frequency with which the first user terminal responds to the response form, and increases a value of a first parameter of the parameters as the frequency is higher. The intermediation device measures a period between moments at which the first user terminal receives the response form and responds to it, and increase a value of a second parameter of the parameters as the period is shorter. The purchasing indicators are classified into a plurality of levels based on a value thereof.

When electronic commerce with the use of a network is performed, there are usually a lot of candidates for trading partners. However, some of them might be window shoppers or mischief-makers who do not have any intention of dealings. Accordingly, for the purpose of efficient electronic commerce, it becomes important to select earnest candidates, that is, candidates having high intention of dealings among all the candidates. However, the selection is difficult in existing search technology on a network. Consequently, the intermediation system of the present invention has been conceived. The feature of this system is to search users by using the purchasing indicators in addition to conventional parameters. The purchasing indicator shows how much the first user terminals (buyers) are interested in corresponding products or services. As its purchasing indicator is higher, the first user terminal is more eager to purchase the product or service. Therefore, the second user terminal (seller) can conduct e-commerce efficiently by having trading discussions with the first user terminals of a high purchasing indicator.

Note that proposals for products or services that are to be sent from the intermediation system do not contain any information specifying a sender source. This makes it possible to conduct trading discussion with keeping confidentiality.

The above intermediation system is provided with the response form manager. This response form manager is adapted to create response forms by which the first user terminal responds to proposals from the second user terminal. This response form contains acceptance and declination items. The intermediation system can monitor response forms sent from the second user terminals. Further, it determines or updates the purchasing indicator, based on a frequency with which the first user terminal responds to the proposal from the second user terminal.

Products or services to be provided by the intermediation system are not limited to specific ones, but they may be real estate properties for investment or household use, art objects, enterprises or intellectual property rights.

The application of the present invention is not limited to the intermediation system, but it may be the information distribution device by which buyers can provide information on their products or services.

The information distribution device first chooses any one among products or services stored in the product/service information manager. In response, the search unit selects, based on the purchasing indicator, one among the first user terminals which is the most suitable for the chosen product or service. Finally, the device sends a proposal of the product or service to the selected first user terminal. This enables the first user terminal to receive the information on the products or services.

Alternatively, the information distribution device first chooses anyone among the first user terminals stored in the first user terminal information manager, based on the purchasing indicator. In response, the search unit selects one among the products or services which is the most suitable for the chosen first user terminal. Finally, the device sends a proposal of the selected product or service to the first user terminal.

To sum up, the present invention enables sellers to find potential buyers to have a trading discussion with. In other words, it enables sellers to utilize e-commerce using a network efficiently.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 3 depicts data structure of a first user terminal information manager in the memory device;

FIG. 4 depicts an example of a user registration form for a first user terminal on a trading site in the intermediation device;

DETAILED DESCRIPTION OF THE EXEMPLARY EMBODIMENTS OF THE INVENTION

First Embodiment

A description will be give below, of a system according to embodiments of the present invention with reference to attached drawings.

Figure 1:
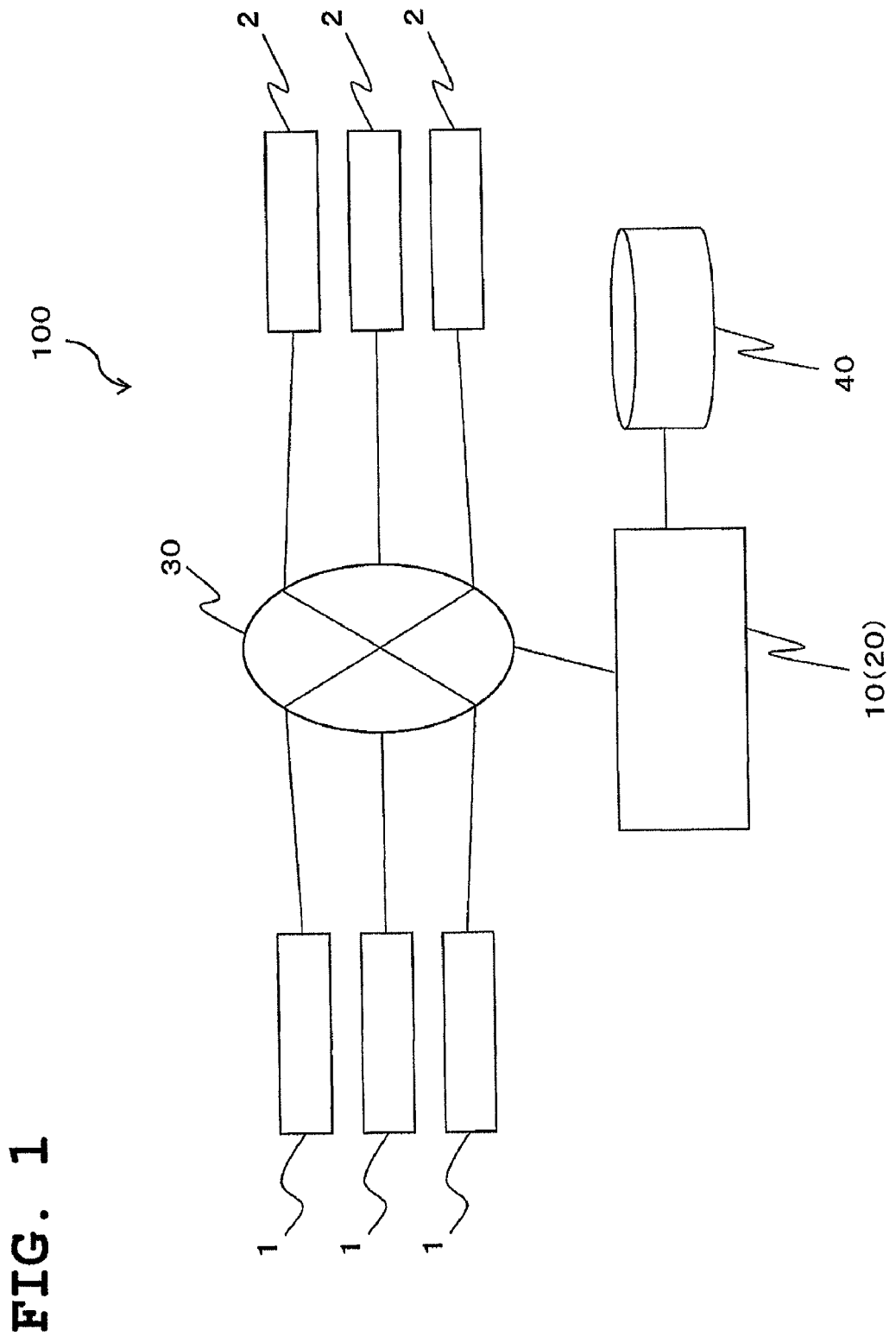
FIG. 1 depicts an outline of an intermediation system for transaction information according to a first embodiment of the present invention.
Figure 2:
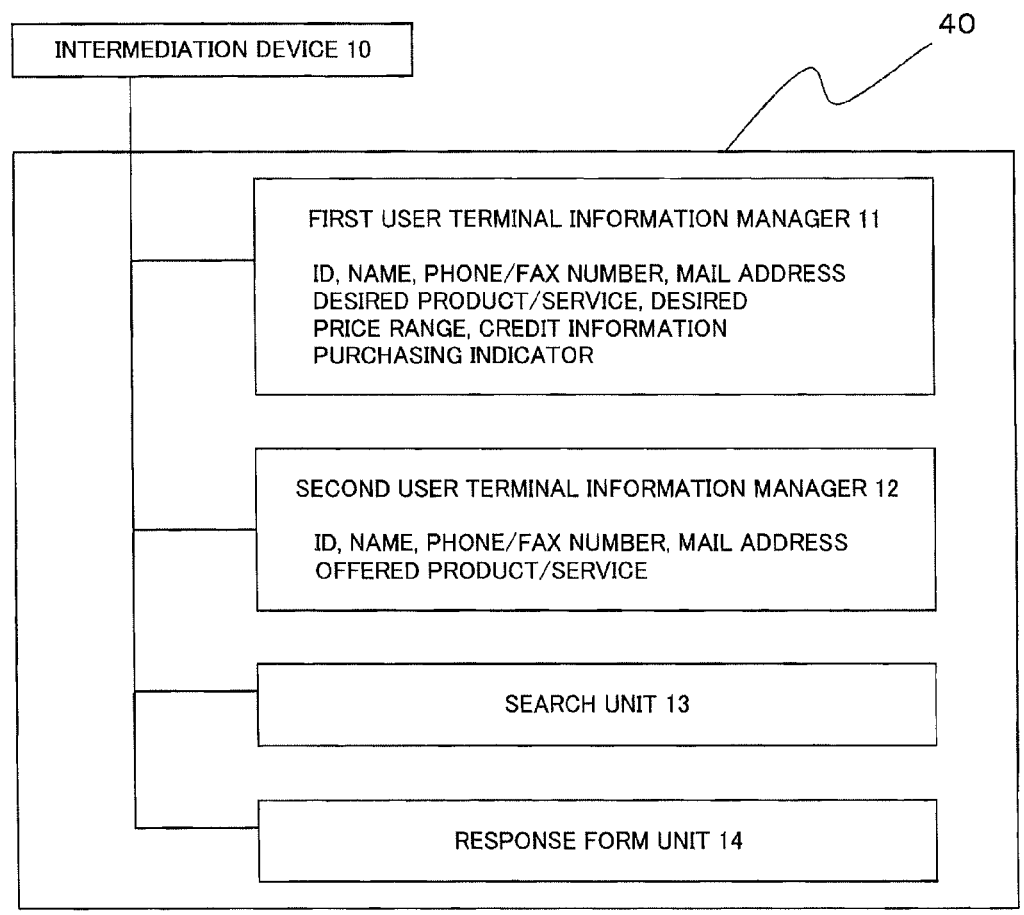
FIG. 2 depicts an internal structure of a memory device in the intermediation system.

First, a description will be given, of a system for mediating transaction information according to a first embodiment of the present invention with reference to FIGS. 1 to 6. FIG. 1 shows an outline of a system for mediating transaction information 100 (hereinafter called "intermediation system") according to a first embodiment of the present invention. FIG. 2 is a drawing showing a structure of a memory device 40 in the intermediation system 100. FIG. 3 shows an example of data table that is handled in a first user terminal information manager 11 in the intermediation device 10. FIG. 4 is an example of an image in which a user registers the user to a first user terminal information manager 11 in the intermediation device 10. As shown in FIG. 1, the intermediation system 100 according to a first embodiment of the present invention mainly includes multiple first user terminals 1 (to be used by buyers), multiple second user terminals 2 (to be used by sellers), an intermediation device 10, a network 30 and a memory device 40. A user of the first user terminal 1 wishes to acquire information on products or services that the user is to purchase. A user of the second user terminal 2 wishes to provide information on products or services that the user is to sell. Both of the terminals are implemented by an existing computer, PDA or cellular phone which has a web-browsing function. In addition, the number of devices is not limited, and it is preferable to an arbitrary number. The intermediation device 10 is the most important component in the intermediation system 100. A processing unit, such as an existing work station, a server or a computer, which is provided with the trading site 20 having a predetermined search feature, can implement intermediation device 10. The intermediation device 10 is adapted to mediate information between the first user terminals 1 and the second user terminals 2. The detail of this function will be described later. The network 30 is adapted to interconnect the first user terminals 1, the second user terminals 2 and the intermediation device 10, and it is implemented by the Internet, Ethernet or WAN. The memory device 40 is a database on which data on the first user terminal 1, the second user terminal 2, products and services is stored, and it is implemented by an existing hard disk, memory, CD-ROM, DVD, flexible disk, magnetic optical disk, blue-ray disk, optical disk or solid state disk. Furthermore, the memory device 40 may be built in the intermediation device 10 or may be implemented by a part of function of the intermediation device 10. Note that an "intermediation device" herein covers the functions of both the intermediation device 10 and the memory device 40.

The following terms to be used in this embodiment indicate the following functions.

"An intermediation system of business information" is the system which expanded a buyer side of website trading shown by prior art to a personal user, and a term is a system intermediating between what provide information of the seller side related to an article through a network or service for the buyer side.

The term "products or services" is not limited to specific ones. Products or services include any ones as long as their information can be exchanged over a network. Examples of products or services include real estate properties for investment or household use, art objects, enterprises and intellectual property rights. In this embodiment, the example of products or services is real estate property. Prior to the utilization of the intermediation system 100, the first and second user terminals 1 and 2 need to access the trading site 20 installed on the intermediation device 10 and, then register them as members. In this case, each user needs to enter some predetermined items of information onto the site 20. FIG. 4 shows an example of image of the trading site 20 upon registration. After this registration, the trading site 20 exhibits thereon information on products or services that the second user terminals 2 offer. The second user terminal 2 utilizes the search function of the trading site 20 on the intermediation device 10 to thereby select a desired one among the first user terminals 1. Following this, the second user terminal 2 sends, to the selected first user terminal 1, information on a product or service that it offers. Furthermore, this information may be displayed on the trading site 20 so that all the members view it.

As shown in FIG. 2, the memory device 40 connected to the intermediation device 10 mainly includes a first user terminal information manager 11, a second user terminal information manager 12, a search unit 13 and a response form manager 14. The first user terminal information manager 11 stores information on the first user terminal 1. The second user terminal information manager 12 stores information on the second user terminal 2. The search unit 13 has program to search the first user terminals 1 for a desired one. The response form manager 14 is an optional component and creates a response form by which the first user terminal 1 responds to proposals received from the second user terminal 2.

The first user terminal information manager 11 contains some items of data on the first user terminals 1, such as IDs, user names, phone/facsimile numbers, e-mail addresses, desired products, desired prices, credit information and purchasing indicators for showing the degree of interest of the first user terminals 1. Those items of data other than the purchasing indicator are inputted to the trading site 20 on the intermediation device 10, and they can be varied or modified as needed. FIG. 3 shows an example of data structure of the first user terminal information manager 11.

In addition, the first user terminal 1 enters a price range of a desired product.

On the other hand, the second user terminal information manager 12 is a database on which information on the second user terminals 2 is stored, and contains user ID, corporate names, addresses, phone/facsimile numbers, e-mail addresses and website URL.

The search unit 13 accesses data on the first and second user terminal information managers 11 and 12 and, then searches the first user terminals 1 for a desired one which is the most suitable for the needs of the second user terminal 2. Specifically, this search process may be performed by using needs number (uniquely assigned to the members), funds (or lower limit of funds), collateral margin, locations of real estate properties, budgets, types of real estate properties, purchasing purposes of real estate properties, structures of real estate properties, ages of real estate properties, coupon yield, comments, last update and purchasing indicators.

The feature of the intermediation system 100 of this embodiment is to employ the purchasing indicator. Specifically, the second user terminal 2 searches the first user terminals 1 for a desired one by using the purchasing indicator. The purchasing indicator is a parameter showing how much the first terminal 1 has interest in a product or service that the second user terminal 2 offers. This means that as the purchasing indicator of a first user terminal 1 is higher, this first user terminal 1 is more likely to purchase the product or service.

The purchasing indicator may be determined based on a frequency with which the first user terminal 1 responds to the proposal from the second user terminal 2, although it is not limited.

Referring to FIG. 1 again, any one of the second user terminals 2 (to be used by a seller) accesses the trading site in the intermediation device 10. Following this, the second user terminal 2 searches for the first user terminal 1 which wishes to purchase a product or service that the second user terminal 2 offers. This searching process is done by using parameters known in this art as well as the purchasing indicators.

Use of the purchasing indicator makes it possible for the second user terminals 2 to know how much the first user terminals 1 wish to purchase their products or services. Accordingly, the second user terminal 2 can know which the first user terminal 1 has the strongest interest in its product or service, that is, which the first user terminal 1 to contact at the highest priority.

The value of the purchasing indicator increases every time the first user terminal 1 responds to the proposal received from the second user terminal 2. In other words, as the first user terminal 1 responds to the received proposal more frequently, the purchasing indicator is made higher so that the first user terminal 1 is more likely to receive proposals.

It is preferable that the interaction between the first and second user terminals 1 and 2 is performed through dedicated response forms. In addition, information that the second user terminal 2 sends the first user terminal 1 may be anonymous. Specifically, this information does not have to contain any data specifying a sender source.

The interaction between the first and second user terminals 1 and 2 is always performed through the intermediation device 10. This enables the intermediation device 10 to determine the purchasing indicators for all the first user terminals 1.

Upon reception of the proposal from the second user terminal 2, the first user terminal 1 shows its decision whether to accept the proposal or decline it by the response form. Hence, the response form may contain acceptance and declination items, and the first user terminal 1 may respond to the proposal by selecting any of both items. In this case, the trading site 20 determines the purchasing indicator for the first user terminal 1 based on the frequency of responses. This response frequency is determined by the following process.

1) counting the number of times in which the first user terminal 1 receives the proposal (value A);

2) monitoring which of the items are checked on the response form;

3) counting the number of times in which the first user terminal 1 accepts the proposal (value B);

4) counting the number of times in which the first user terminal 1 declines the proposal (value C);

5) dividing the sum of the values B and C by the number A (value D); and 6) letting the value D be a response frequency.

The purchasing indicator may be classified into several levels based on its level (see table 1). In the following table, the purchasing indicator is classified into five levels. By referring to this indicator, the second user terminal 2 can contact the first user terminal 1 having the highest level of the purchasing indicator.

TABLE 1

| Purchasing Indicator | Meaning | Response frequency |
| --- | --- | --- |
| XXXXX | Great level | 81 to 100% |
| XXXX | High level | 61 to 80% |
| XXX | Normal level | 41 to 60% |
| XX | Low level | 21 to 40% |
| X | Poor level | 0 to 20% |

*Response frequency = (the number of acceptance)/(the number of received proposals)

As described above, the process for determining the purchasing indicator has been described. However, the present invention is not limited to this process. Optionally, one or several coefficients for determining the purchase indicator may be set. One example of those coefficients may be a period between moments at which the first user terminal 1 receives the proposal and responds to it. In this case, as the response period is shorter, the coefficient may be made higher, which makes the purchasing indicator higher. Another example of the coefficients may be a period that has elapsed since the first user terminal 1 last logged in the trading site 20. In this case, as the elapsed period is shorter, the coefficient may be made higher, which makes the purchasing indicator higher.

Up to this point, the basic function of the intermediation system 100 of the first embodiment has been described.

Next, a description will be given below, of a method of mediating transaction information that is performed by the intermediation system 100.

[Process of Registering User with Trading Site 20]

The trading site 20 provided by the intermediation device 10 does not permit anyone other than members to access. In other words, it is a so-called member-limited open site. Therefore, in order to use the intermediation system 100, the first and second user terminals 1 and 2 need to register them to the trading site 20 as members.

Figure 5:
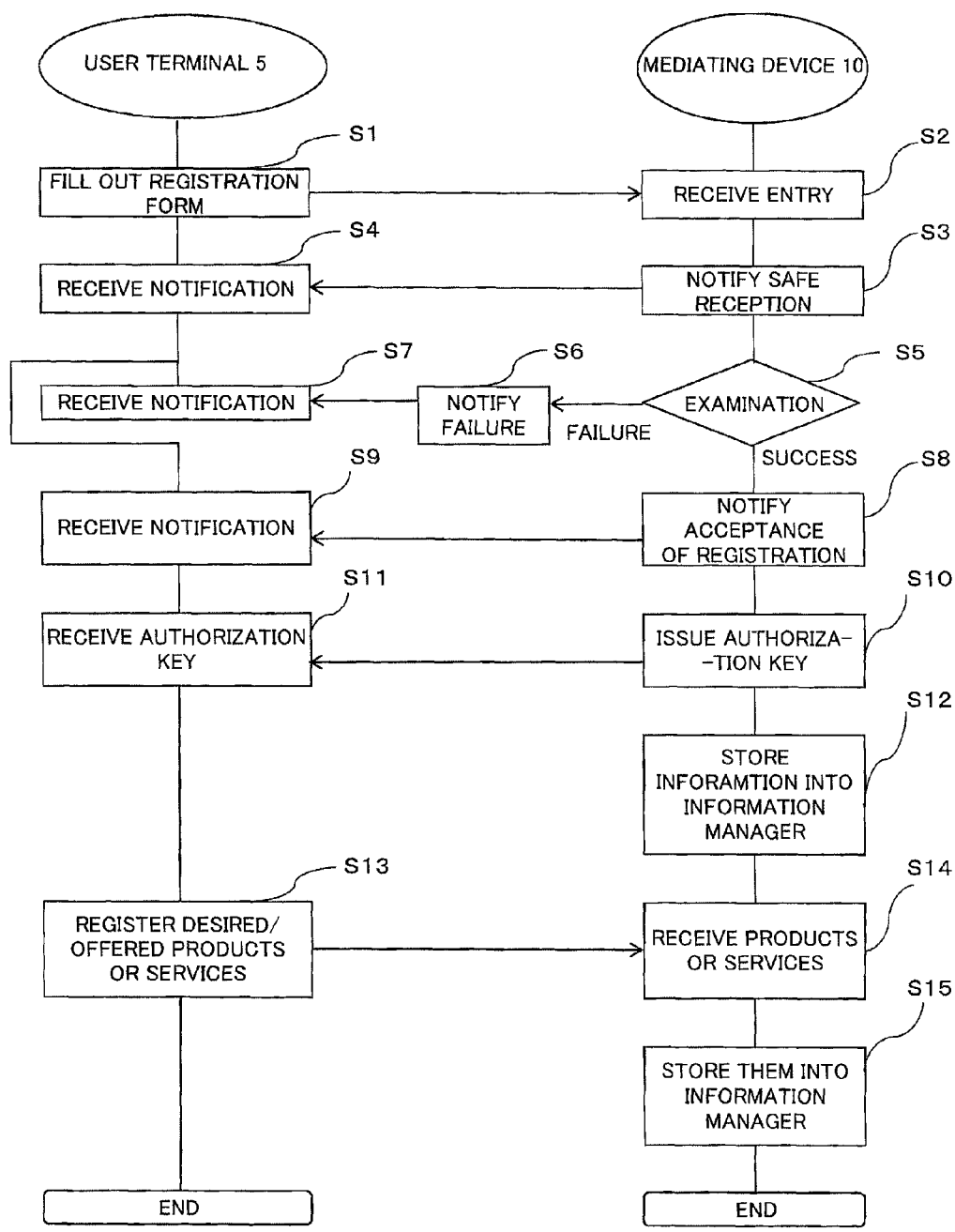
FIG. 5 depicts a flowchart of a process for registering a user to the trading site as a member.
Figure 6:
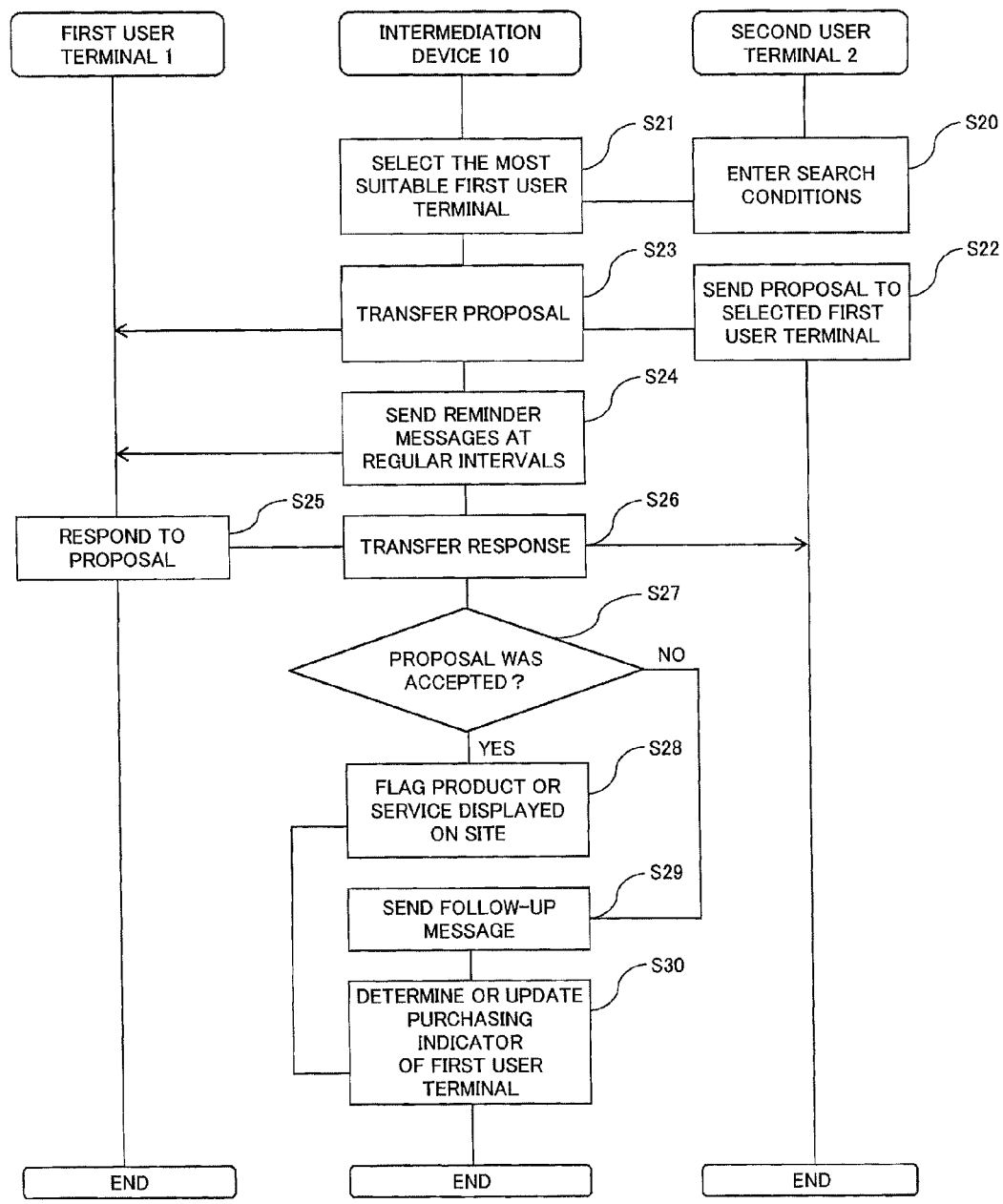
FIG. 6 depicts a flowchart of mediating process carried out by the mediating system.

A process of registering a user with the trading site 20 will be described with reference to FIG. 5. Note that "user terminal 5" means either of the first and second user terminals 1 and 2.

The user terminal 5 accesses an open page (a page for non-members) of the trading site 20 in the intermediation device 10 and, then fills out a registration form of the trading site 20 by entering predetermined items of information thereto (step S1). The intermediation device 10 receives this entry (step S2) and, then sends, to the user terminal 5, information on the safe reception of the entry (step S3). The user terminal 5 receives this information (step S4).

Subsequently, the intermediation device 10 examines the user of the user terminal 5 that has applied for the registration (step S5). The examination method is not limited in this embodiment, but it may be a typical method in the electronic commerce field. If the examination result is "failure", then the intermediation device 10 informs the user terminal 5 about this result (step S6). Once the failure result is sent to the user terminal 5, it is not permitted to conduct the following steps (step S7).

On the other hand, if the examination result is "success", then the trading site 20 registers the user terminal 5 and, then informs it of the result (step S8). After the registration, the trading site 20 may inform other members that the user terminal 5 becomes a new member by displaying it thereon or by sending e-mails. The intermediation device 10 sends an authentication key to the user terminal 5 (step S10). Once receiving it (step S11), the user terminal 5 is permitted to access this member-limited EC site by inputting the authentication key into the trading site 20. The intermediation device 10 accesses the memory device 40 and, then stores thereon predetermined information on the first and second user terminal information managers 11 and 12 (step S12).

If the user terminal 5 is the first user terminal 1, then it registers the products or services that it wants, and enters the predetermined information on them. Meanwhile, if the user terminal 5 is the second user terminal 2, then it registers its products or services and enters the predetermined information on them. After the registration and entry are completed (step S13), the intermediation device 10 accepts this registration (step S14). Following this, the intermediation device 10 accesses the memory device 40 and, then stores the registered and entered information onto the first and second user terminal information managers 11 and 12 (step S15). Through the above steps, the process of registering a membership with the trading site 20 has been done.

Generally, before a trade contract between a seller and a buyer is established, both of the seller and buyer need to find their party, individually. Following this, they examine their party, mutually. Only when both of their parties pass the examinations, they conduct business discussion and establish the contract. This process can be very troublesome. However, in this embodiment, their potential partners are registered in the intermediation system 100. Accordingly it is relatively easy for the buyers or sellers to find their party. Furthermore, the registered sellers and buyers have already passed the examination conducted by the intermediation device 10. Therefore, the members can omit their individual examination or simplify it. Moreover, any member can access various pieces of information on other members. The information can be utilized in determining and examining the party. As a result, the above troublesome procedures are made simple and the burden is made light.

[Method for Mediating Transaction Information]

After the registration is completed by performing the above process, the intermediation system 100 mediates transaction information between buyers and sellers. A description will be given, of a method for mediating transaction information with reference to FIG. 6.

First, the second user terminal 2 (seller) accesses the trading site 20 by inputting its authentication key thereto. Subsequently, the second user terminal 2 inputs predetermined search conditions in order to search for the first user terminal 1 (buyer) that the second user terminal 2 is to send information on its products or services (step S20). In response to this, the intermediation device 10 executes the search function of the memory device 40 to select the most suitable one among all the first user terminals 1 (step S21). Note that the search conditions contain the items having been inputted at the step S20 as well as the purchasing indicators stored in the first user terminal information manager 11. The second user terminal 2 can refer to the information on the selected first user terminal 1 by accessing the first user terminal information manager 11.

After selecting the first user terminal 1 as a trading party, the second user terminal 2 sends a proposal for its product or service to the intermediation device 10 (step S22). Upon receipt of this proposal, the intermediation system 100 transfers it to the first user terminal 1 (step S23). This proposal may contain not only information on the product or service but also additional information such as information about the seller (company) of the second user terminal or a questionnaire. Moreover, the above information may be anonymous, that is, contain no information specifying a sender source (buyer). The intermediation device 10 may send one or more reminders to the first user terminal 1 as an optional action (step S24). Specifically, the intermediation device 10 monitors a time period after sending of the proposal, and sends reminder messages at regular intervals. Subsequently, the intervals are not limited, but they may be 10, 30 and 60 days, for example.

Receipt of the proposal, the first user terminal 1 refers to the information on the product or service, and it then responds to this proposal (step S25). This response is done by the response form presented by the response form manager 14. The response has a selection of "acceptance" and "declinature". The acceptance may contain some questions.

If "acceptance" is selected ("YES" at step S27), then the intermediation device 10 flags where the product or service is displayed on the trading site 20. This allows viewers to recognize that the flagged product or service is under trade discussion (step S28). After this step, the first user terminal 1 and the second user terminal 2 conduct business discussion. Subsequently, the process will jump to a step S30.

On the other hand, if "declinature" is selected ("NO" at step S27), then the intermediation device 10 may send the first user terminal 1 a follow-up message as an optional action (step S29). Optionally, the first user terminal 1 may block any information from the second user terminal 2 by employing a filter function. Subsequently, the process will proceed to the step S30. At the step S30, the intermediation device 10 determines or updates the purchasing indicator of the first user terminal 1 based on its response. The process is then over.

Note that the response from the first user terminal 1 at the step 27 may be anonymous. Alternatively, only if the response is "acceptance", then the response may contain the personal information on the first user terminal 1. This enables the protection of the personal information.

Up to this point, the method of mediating transaction information that is executed by the intermediation system 100 has been explained. Note that the functions of the intermediation device 10 which have been described above are not limited to those realized by specific resources such as software or hardware. Those functions may be achieved by any of hardware, software and a combination thereof. When the mediating method is performed by program, this program may be obtained via downloading or computer readable medium. An example of a medium includes CD-ROM, DVD, flexible disk, magnetic optical disk, blue-ray disk, optical disk, solid state disk, and hard disk.

Second Embodiment

A description will be given below, of an intermediation system according to a second embodiment of the present invention with reference to FIG. 7.

Figure 7:
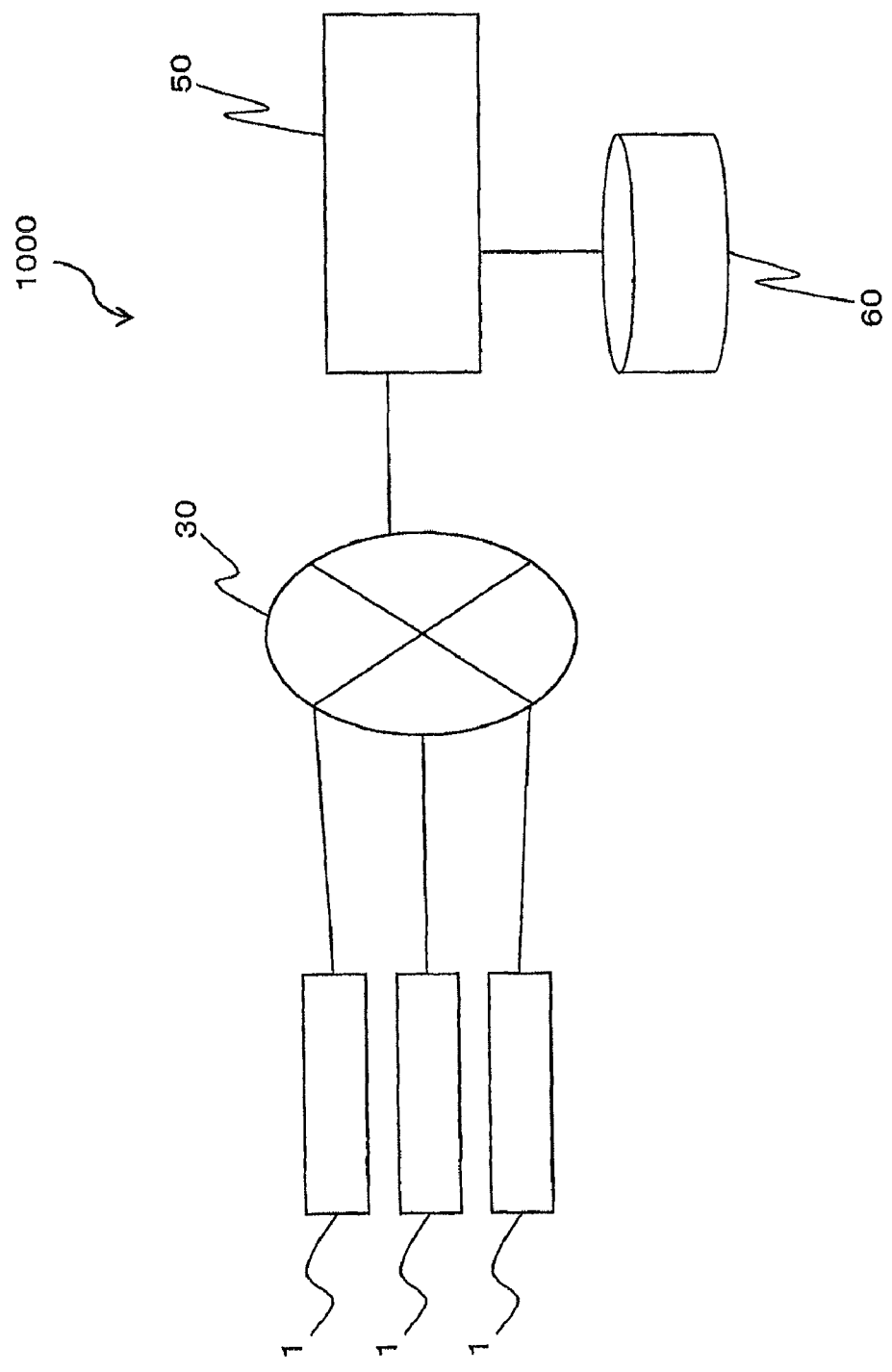
FIG. 7 depicts an outline of an information distribution system for transaction information according to a second embodiment of the present invention.

FIG. 7 is a figure showing an outline of an intermediation system 1000 according to a second embodiment of the present invention. As shown in this figure, the intermediation system 1000 includes multiple first user terminals 1, a network 30, an information distribution device 50 and a memory device 60. The information distribution device 50 has functions that are similar to those of both the intermediation device 10 and the second user terminals 2 in the intermediation system 100 of the first embodiment. Note that in FIG. 7, components constituting the intermediation system 1000 which have the same function as those of the system 100 have the same reference numbers. In addition, an explanation for those components will be omitted.

Figure 8:
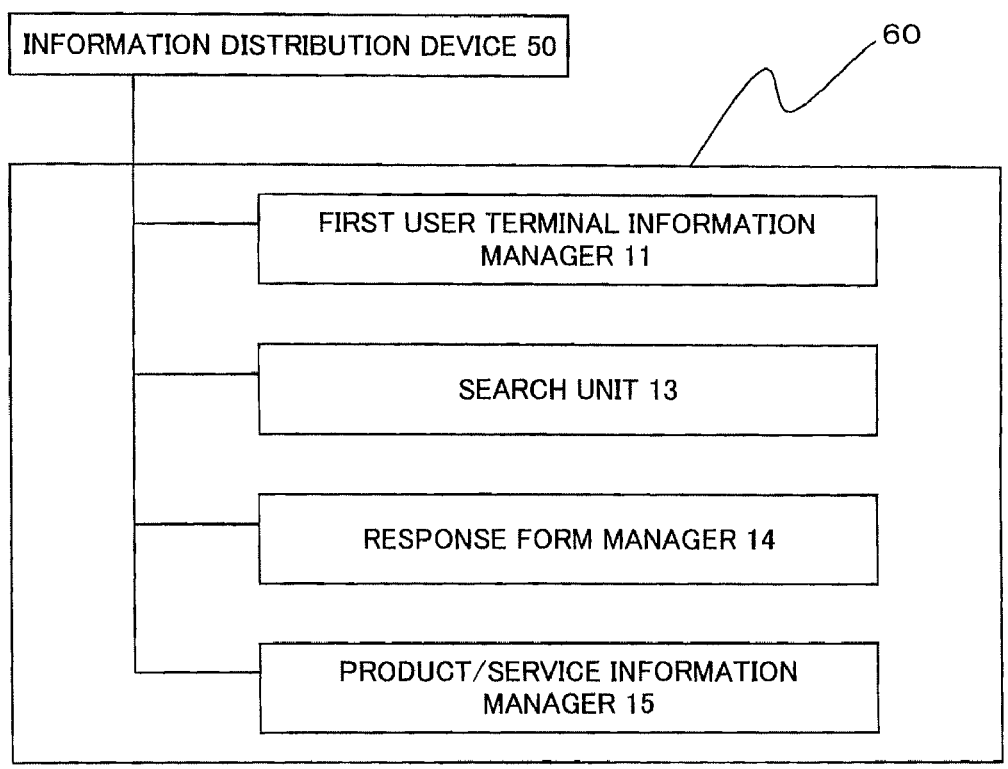
FIG. 8 depicts an internal structure of a memory device in the information distribution system.

Referring to FIG. 8, the information distribution device 50 is adapted to provide the first user terminals 1 with information on products or services through the network 30. This information distribution device 50 mainly includes the first user terminal information manager 11, the search unit 13, the response form manager 14 and a product/service information manager 15. The first user terminal information manager 11 contains information on the first user terminals, including user IDs, phone/facsimile numbers, wanted products or services, and purchasing indicators. The information distribution device 50 first chooses any one among products or services stored in the product/service information manager 15. In response, the search unit 13 selects, based on the purchasing indicator, one among the first user terminals 1 which is the most suitable for the chosen product or service. Finally, the device 50 sends a proposal of the product or service to the selected first user terminal 1. This enables the first user terminal 1 to receive the information on the product or service, similar to the first embodiment.

Alternatively, the information distribution device 50 first chooses any one among the first user terminals 1 stored in the first user terminal information manager 11, based on the purchasing indicator. In response, the search unit 13 selects one among the products or services which is the most suitable for the chosen first user terminal 1. Finally, the device 50 sends a proposal of the selected product or service to the first user terminal 1.

Up to this point, the systems according to the first and second embodiments of the present invention have been described. However, the present invention is not limited to those embodiments, and various applications are conceivable. In the embodiments, the products or services are not limited to specific ones such as real estate properties. They may be various commercial objects. If the products or services are art objects, then their information items include price, producer, age, purpose of purchase in addition to the purchasing indicators. If the products or services are enterprises, then their information items may include place, price, the number of stocks, business category, the number of employees, current profit, purpose of purchase and foundation in addition to the purchasing indicators. Furthermore, products or services may have various variations. In this case, the intermediation system 100 or 1000 can provide a wide variety of products or services individually.

In the embodiments, the sellers send their proposals to the buyers. However, the buyers may send their proposals to the sellers.

The information item may contain a range of, for example, price, and the intermediation system 100 or 1000 searches for the most proper first user terminal 1 based on the parameter range.

Moreover, one or both of the intermediation device 10 and the information distribution device 50 may store the responses from the first user terminal 1 for predetermined times (for example, 10 times) and, then display the stored responses in a list form. For example, if the products or services are real estate properties, then the responses for each type, place, coupon yield, actual age, structure, and price are displayed in a list forms. In this case, the intermediation device 10 or the information distribution device 50 may include a history memory unit for the history of response for the first user terminals 1 for each product or service, and a history list generation unit for generating a history list based on the response history. Furthermore, if the products or services are real estate properties, then the intermediation device 10 or the information distribution device 50 may display the response frequency for each user terminal, area, price, etc. in the list form.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A system for mediating transaction information, comprising:
    a plurality of first user terminals for receiving information on a desired product or service via a network;
    a plurality of second user terminals for providing information on products or services which they offer; and
    an intermediation device for mediating the information between the first user terminals and the second user terminals, the intermediation device having a site on which the products or services are displayed, the intermediation device for selecting a first user terminal among the first user terminals in accordance with requirement from any one of the second user terminals and for providing, to the selected first user terminal, information on a product or service which the second user terminal offers,
    the intermediation device comprising:
    a first user terminal information manager for storing information on the first user terminals and their desired products or services, and for determining or updating purchasing indicators of the first user terminals, based on parameters regarding the first user terminals, the purchasing indicators representing how much the first user terminals have interests in a product or service;
    a second user terminal information manager for storing information on the second user terminals, products or services that the second user terminals offer, and requirement for selling the products or services;
    a search unit for selecting a first user terminal among the first user terminals which is the most suitable for a product or service which any one of the second user terminals offers, based on the purchasing indicators and the requirement for selling the products or services; and
    a response form manager for creating a response form containing acceptance and declination items to be used when the first user terminals respond to proposals from the second user terminals,
    wherein the intermediation device informs the second user terminal about the search result when the intermediation device selects a first user terminal among the first user terminals in accordance with requirement from any one of the second user terminals, and the second user terminal sends the first user terminal the information on a product or service which the second user terminal offers, while the response form manager sends the response form to the first user terminal,
    wherein the first user terminal information manager measures a frequency with which the first user terminal responds to the response form, and increases a value of a first parameter of the parameters as the frequency is higher,
    wherein the first user terminal information manager measures a period between moments at which the first user terminal receives the response form and responds to it, and increase a value of a second parameter of the parameters as the period is shorter,
    wherein the first user terminal information manager determines or updates the purchasing indicator based on the first and second parameters and classifies the purchasing indicator into a plurality of levels based on a value thereof,
    wherein if the first user terminal does not respond to the respond form, then the intermediation device sends, at regular intervals, massages for recommending the response to the first user terminal, and the first user terminal information manager makes the first parameter lower as the frequency is lower and makes the second parameter lower as the period is longer, and the first user terminal information manager determines or updates the purchasing indicator based on the first and second parameters, wherein if the intermediation device receives the response form in which the first user terminal checks the acceptance item, the intermediation device sends a message for recommending business discussion to the first and second user terminals, and wherein if the intermediation device receives the response form in which the first user terminal checks the declination item, the intermediation device sends a message for recommending reconsideration.

2. The system according to claim 1,
wherein the purchasing indicator is determined or updated based on a third parameter in addition to the first and second parameters, and the third parameter depends on time having elapsed since last time when the first user terminal logged in the site.

3. The system according to claim 1,
wherein the intermediation device exhibits, on the site, the information exchanged between the first user terminals and the second user terminals.

4. The system according to claim 1,
wherein if the first user terminal checks the acceptance item, then the intermediation device flags the products or services displayed on the site in order for every viewer to recognize that the product or service is under business discussion.

5. A device connected to a plurality of first user terminals and a plurality of second user terminals via a network, the first user terminals for receiving information on a desired product or service, the second user terminals for providing information on products or services which they offer, the device for mediating the information between the first and second user terminals and having a site on which the products or services are displayed, the device for selecting a first user terminal among the first user terminals in accordance with requirement from any one of the second user terminals, said device comprising:

a first user terminal information manager for storing information on the first user terminals and their desired products or services, and for determining or updating purchasing indicators of the first user terminals, based on parameters regarding the first user terminals, the purchasing indicators representing how much the first user terminals have interests in a product or service;

a second user terminal information manager for storing information on the second user terminals, products or services that the second user terminals offer, and requirement for selling the products or services;

a search unit for selecting a first user terminal among the first user terminals which is the most suitable for a product or service which any one of the second user terminals offers, based on the purchasing indicators and the requirement for selling the products or services; and a response form manager for creating a response form containing acceptance and declination items to be used when the first user terminals respond to proposals from the second user terminals, wherein the device sends the second user terminal a message for recommending sending of a product or service which the second user terminal offers to the selected first user terminal, wherein the first user terminal information manager measures a frequency with which the first user terminal responds to the response form, and increases a value of a first parameter of the parameters as the frequency is higher, wherein the first user terminal information manager measures a period between moments at which the first user terminal receives the response form and responds to it, and increase a value of a second parameter of the parameters as the period is shorter, wherein the first user terminal information manager determines or updates the purchasing indicator based on the first and second parameters and classifies the purchasing indicator into a plurality of levels based on a value thereof, wherein if the first user terminal does not respond to the respond form, then the device sends, at regular intervals, massages for recommending the response to the first user terminal, wherein if the device receives the response form in which the first user terminal checks the acceptance item, the device sends a message for recommending business discussion to the first and second user terminals, and wherein if the device receives the response form in which the first user terminal checks the declination item, the device sends a message for recommending reconsideration.

6. The device according to claim 5,
wherein the purchasing indicator is determined or updated based on a third parameter in addition to the first and second parameters, and the third parameter depends on time having elapsed since last time when the first user terminal logged in the site.

7. The system according to claim 5,
wherein the device exhibits, on the site, the information exchanged between the first user terminals and the second user terminals.

8. The device according to claim 5,
wherein if the first user terminal checks the acceptance item, then the device flags the products or services displayed on the site in order for every viewer to recognize that the product or service is under business discussion.

9. An information distribution device connected to a plurality of first user terminals via a network, the first user terminals for receiving information on a desired product or service, the information distribution device providing the first user terminals with information on products or services which the first user terminals want, said information distribution device comprising:

a first user terminal information manager for storing information on the first user terminals and their desired products or services, and for determining or updating purchasing indicators of the first user terminals, based on parameters regarding the first user terminals, the purchasing indicators representing how much the first user terminals have interests in a product or service;

a product/service information manager for storing information on products or services and requirement for selling products or services;

a search unit for selecting a first user terminal among the first user terminals which is the most suitable for any one of the products or services, based on the purchasing indicators and the requirement for selling the products or services; and a response form manager for creating a response form containing acceptance and declination items to be used when the first user terminals respond to the received information, wherein the information distribution device sends information on the product or service to the selected first user terminal, wherein the first user terminal information manager measures a frequency with which the first user terminal responds to the response form, and increases a value of a first parameter of the parameters as the frequency is higher, wherein the first user terminal information manager measures a period between moments at which the first user terminal receives the response form and responds to it, and increase a value of a second parameter of the parameters as the period is shorter, wherein the first user terminal information manager determines or updates the purchasing indicator based on the first and second parameters and classifies the purchasing indicator into a plurality of levels based on a value thereof, wherein if the first user terminal does not respond to the respond form, then the information distribution device sends, at regular intervals, massages for recommending the response to the first user terminal, wherein if the information distribution device receives the response form in which the first user terminal checks the acceptance item, the information distribution device sends a message for recommending business discussion to the first user terminal, and wherein if the information distribution device receives the response form in which the first user terminal checks the declination item, the information distribution device sends a message for recommending reconsideration.

10. A method of providing information on products or services by mediating the information between first user terminals and second user terminals, the method to be executed by an intermediation device connected between the first and second user terminals via a network, the first user terminals for receiving information on a desired product or service, the second user terminals for providing information on products or services which they offer, said method comprising:

a first step of maintaining information on the first user terminals, including their desired products or services, and determining or updating purchasing indicators of the first user terminals, based on parameters regarding the first user terminals, the purchasing indicators representing how much the first user terminals have interests in a product or service;

a second step of maintaining information on the second user terminals, including information on their products or services and requirement for selling products or services;

a third step of selecting a first user terminal among the first user terminals which is the most suitable for a product or service which any one of the second user terminals offers, based on the purchasing indicators and the requirement for selling the products or services;

a fourth step of informing the second user terminal about the first user terminal having been selected in the third step, and sending, to the second user terminal, a message for recommending sending of information on the product or service to the selected first user terminal;

a fifth step of sending, to the selected first user terminal, a response form containing acceptance and declination items which is to be used to respond to the information from the second user terminal;

a sixth step of sending, at regular intervals, massages for recommending the response to the first user terminal if the first user terminal does not respond to the respond form;

a seventh step of sending a message for recommending reconsideration if the intermediation device receives the response form in which the first user terminal checks the declination item; and an eighth step of sending a message for recommending business discussion to the first and second user terminals if the device receives the response form in which the first user terminal checks the acceptance item, wherein in the first step of determining or updating the purchasing indicators of the first user terminals, based on the parameters, the parameter includes first and second parameters, wherein the intermediation device measures a frequency with which the first user terminal responds to the response form, and increases a value of a first parameter of the parameters as the frequency is higher, wherein the intermediation device measures a period between moments at which the first user terminal receives the response form and responds to it, and increase a value of a second parameter of the parameters as the period is shorter, and wherein the purchasing indicators are classified into a plurality of levels based on a value thereof.

11. A non-transitory computer readable medium storing program which makes a computer execute a method of providing information on products or services by mediating the information between first user terminals and second user terminals, the method to be executed by an intermediation device connected between the first and second user terminals via a network, the first user terminals for receiving information on a desired product or service, the second user terminals for providing information on products or services which they offer, said method comprising:

a first step of maintaining information on the first user terminals, including their desired products or services, and determining or updating purchasing indicators of the first user terminals, based on parameters regarding the first user terminals, the purchasing indicators representing how much the first user terminals have interests in a product or service;

a second step of maintaining information on the second user terminals, including information on their products or services and requirement for selling products or services;

a third step of selecting a first user terminal among the first user terminals which is the most suitable for a product or service which any one of the second user terminals offers, based on the purchasing indicators and the requirement for selling the products or services;

a fourth step of informing the second user terminal about the first user terminal having been selected in the third step, and sending, to the second user terminal, a message for recommending sending of information on the product or service to the selected first user terminal;

a fifth step of sending, to the selected first user terminal, a response form containing acceptance and declination items which is to be used to respond to the information from the second user terminal;

a sixth step of sending, at regular intervals, massages for recommending the response to the first user terminal if the first user terminal does not respond to the respond form;

a seventh step of sending a message for recommending reconsideration if the intermediation device receives the response form in which the first user terminal checks the declination item; and an eighth step of sending a message for recommending business discussion to the first and second user terminals if the device receives the response form in which the first user terminal checks the acceptance item, wherein in the first step of determining or updating the purchasing indicators of the first user terminals, based on the parameters, the parameter includes first and second parameters, wherein the intermediation device measures a frequency with which the first user terminal responds to the response form, and increases a value of a first parameter of the parameters as the frequency is higher, wherein the intermediation device measures a period between moments at which the first user terminal receives the response form and responds to it, and increase a value of a second parameter of the parameters as the period is shorter, and wherein the purchasing indicators are classified into a plurality of levels based on a value thereof.

* * * * *